United States Patent
Roberts et al.

(10) Patent No.: US 11,403,696 B2
(45) Date of Patent: *Aug. 2, 2022

(54) CLIENT CENTRIC VIEWER

(71) Applicant: Bank of America Corporation, Charlotte, NC (US)

(72) Inventors: Andrew Roberts, Moorestown, NJ (US); Umashankar Bandi, Monmouth Junction, NJ (US); Jayakumar Chellaganapathysubramanian, Princeton, NJ (US); Karolyn Currence, Charlotte, NC (US); Janaki Iyer, Dayton, NJ (US); Brennan Jablonski, Philadelphia, PA (US); Heather Klemmer, Stockton, NJ (US); Joseph Matzerath, Hazlet, NJ (US); James Rajeshvincent, Kendall Park, NJ (US); Jonathan Wilcox, Robbinsville, NJ (US)

(73) Assignee: Bank of America Corporation, Charlotte, NC (US)

(*) Notice: Subject to any disclaimer, the term of this patent is extended or adjusted under 35 U.S.C. 154(b) by 150 days.

This patent is subject to a terminal disclaimer.

(21) Appl. No.: 16/995,075

(22) Filed: Aug. 17, 2020

(65) Prior Publication Data

US 2020/0380590 A1  Dec. 3, 2020

Related U.S. Application Data

(63) Continuation of application No. 16/170,873, filed on Oct. 25, 2018, now Pat. No. 10,776,859, which is a
(Continued)

(51) Int. Cl.
*G06Q 30/00* (2012.01)
*G06Q 30/06* (2012.01)
*G06F 3/0481* (2022.01)

(52) U.S. Cl.
CPC ....... *G06Q 30/0641* (2013.01); *G06F 3/0481* (2013.01)

(58) Field of Classification Search
CPC .................................................... G06Q 30/00
See application file for complete search history.

(56) References Cited

U.S. PATENT DOCUMENTS 7,949,574 B2   5/2011  Patel et al.
8,326,694 B2   12/2012 Patel et al.
(Continued)

OTHER PUBLICATIONS

Oracle, Fusion Middleware User's guide for oracle business intelligence enterprise addition release 1(11.1.1), docs.oracle.com, dated Sep. 3, 2010. (Year: 2010).*
(Continued)

*Primary Examiner* — Mark A Fadok
(74) *Attorney, Agent, or Firm* — Banner & Witcoff, Ltd.

(57) ABSTRACT

A client viewer computing system may be configured to scan a plurality of business application computing systems that correspond to products and/or services provided by a business organization. The client view computing system may receive a customer identifier from an employee and, in response to the customer identifier, obtain information corresponding to the customer's interactions with the plurality of products and/or services offered by the business organization. Based on one or more customer attributes, the client viewer computing system may identify one or more products and/or services the customer for which the customer qualifies and display the identified opportunities on a customer centric viewer user interface.

20 Claims, 13 Drawing Sheets

Related U.S. Application Data continuation of application No. 14/538,346, filed on Nov. 11, 2014, now Pat. No. 10,140,650.

(56) References Cited

U.S. PATENT DOCUMENTS

| | | |
|---|---|---|
| 8,346,662 B2 | 1/2013 | Korgav et al. |
| 2002/0087385 A1 | 7/2002 | Vincent |
| 2002/0161706 A1 | 10/2002 | Brinskele et al. |
| 2007/0211881 A1 | 9/2007 | Parker-Stephen |
| 2008/0077462 A1 | 3/2008 | Patel et al. |
| 2008/0086402 A1 | 4/2008 | Patel et al. |
| 2008/0208786 A1 | 8/2008 | Serrano-Morales et al. |
| 2009/0287604 A1 | 11/2009 | Korgav et al. |
| 2009/0310774 A1 | 12/2009 | Hendricks et al. |
| 2011/0173077 A1 | 7/2011 | Patel et al. |
| 2012/0116880 A1 | 5/2012 | Patel et al. |
| 2012/0123824 A1 | 5/2012 | Patel et al. |
| 2012/0150659 A1 | 6/2012 | Patel et al. |
| 2013/0151349 A1 | 6/2013 | Patel et al. |
| 2013/0179265 A1 | 7/2013 | Winslade |
| 2013/0211858 A1 | 8/2013 | Ohnemus et al. |
| 2013/0238447 A1 | 9/2013 | Patel et al. |
| 2013/0246189 A1 | 9/2013 | Patel et al. |
| 2013/0346246 A1 | 12/2013 | Patel et al. |
| 2014/0012683 A1 | 1/2014 | Patel et al. |
| 2014/0040044 A1 | 2/2014 | Patel et al. |
| 2014/0233719 A1 | 8/2014 | Vymenets et al. |
| 2015/0161644 A1 | 6/2015 | Bamane et al. |
| 2016/0062972 A1 | 3/2016 | Ramakrishnan et al. |

OTHER PUBLICATIONS

Anonymous, "The Customer Service Desktop", Jacada, Dated Circa 2011, (Year: 2011).

\* cited by examiner

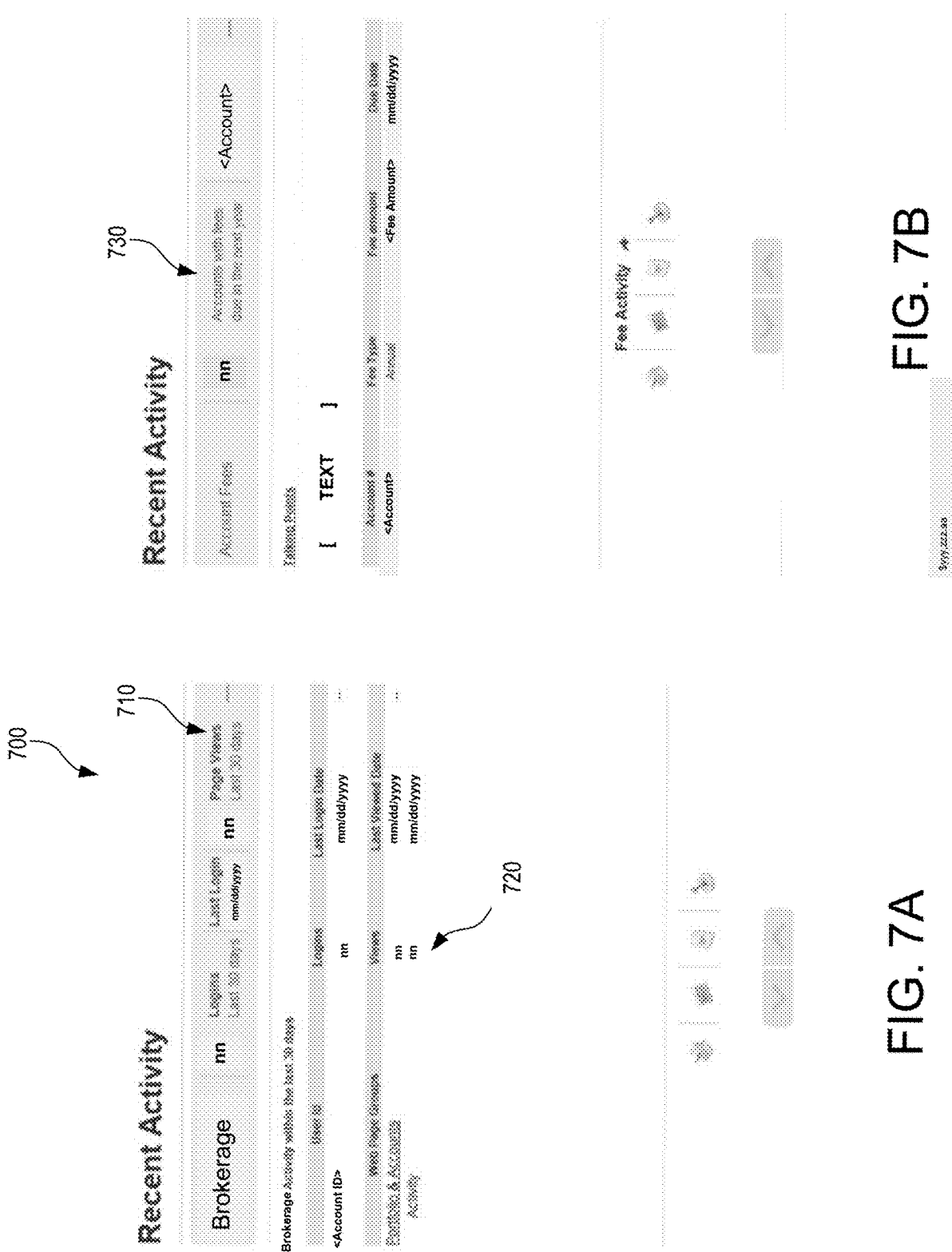

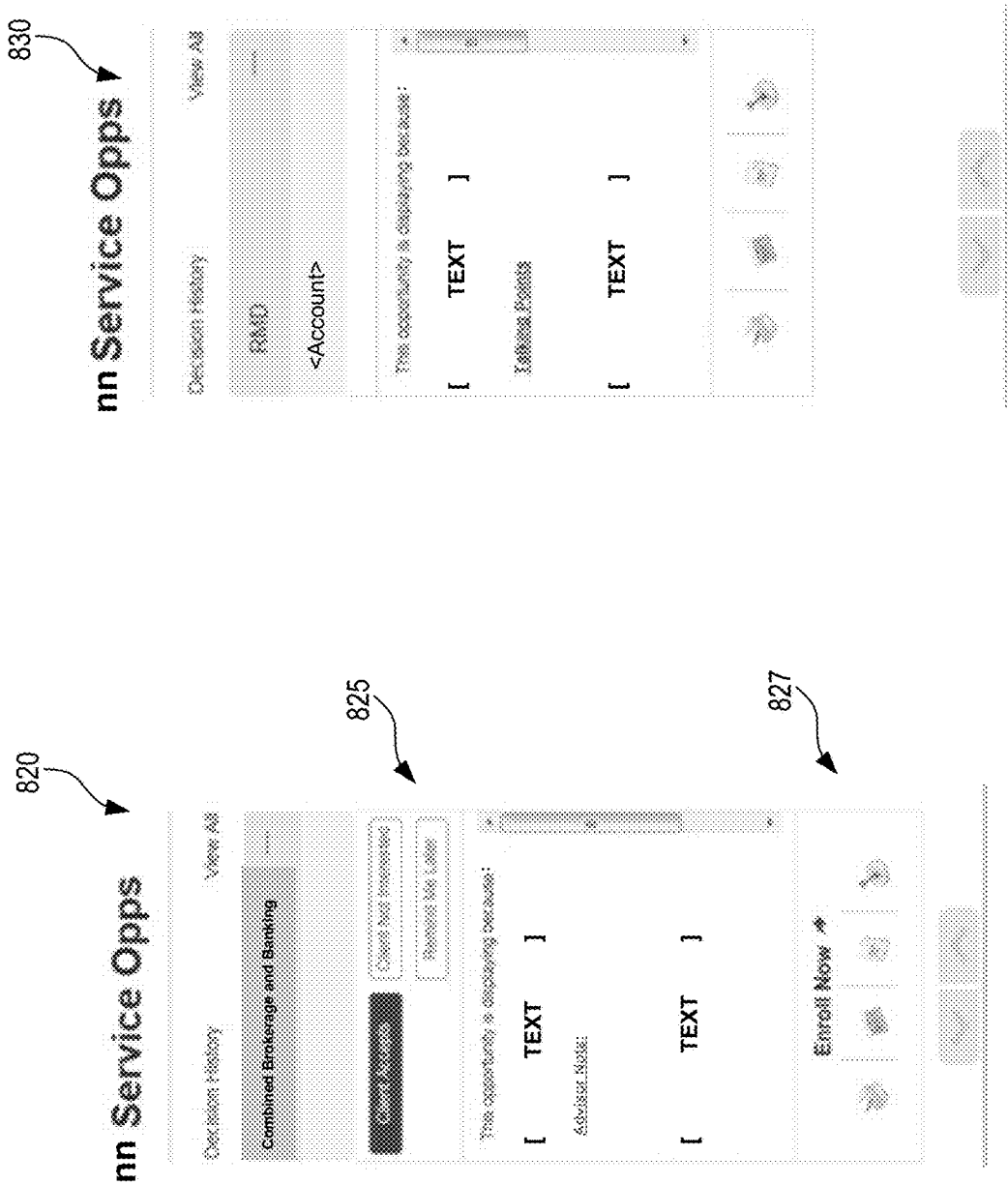

CLIENT CENTRIC VIEWER

CROSS REFERENCE TO RELATED APPLICATIONS

This application is a continuation of U.S. application Ser. No. 16/170,873 filed Oct. 25, 2018, which is a continuation of U.S. application Ser. No. 14/538,346 filed Nov. 11, 2014 (now U.S. Pat. No. 10,140,650, issued Nov. 27, 2018), and entitled, "Client Centric Viewer," which is incorporated herein by reference in its entirety.

BACKGROUND

A business organization, such as a financial institution, may offer multiple products (e.g., financial products) and/or services (e.g., financial services) to customers. The different products and services are often supported by applications dedicated and/or specifically designed to provide a particular product and/or service. The different applications may not be compatible or may not store associated information in a common data format. As such, company employees, when reviewing customer interactions with the company, may need to open each application individually to determine, for example, a status of a customer account.

SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

In some embodiments, a client centric viewer may be configured for receiving, at a user interface of the client centric viewer. The client identifier may identify a customer of a business organization. In some cases, the client centric viewer may request from a plurality of business application computing systems, by the client centric viewer, utilization information corresponding to products and services offered by the business organization and used by the customer and may receive via a network form the plurality of business application computing systems. The utilization information may correspond to customer usage of the products and services offered by the business organization. In some cases, the client viewer may be configured for analyzing, by the client centric viewer, the utilization information to identify a business opportunity for the business organization to offer to the customer. The client centric viewer may display, on a display device associated with the client centric viewer, at least a portion of the customer information obtained from the plurality of business application computing systems in a first section of client dashboard user interface screen and the identified business opportunity in a second section of the client dashboard user interface screen.

In some cases, a system may include a client centric viewer communicatively coupled via a network to a first plurality of business application systems and a second plurality of business application systems. The client centric viewer may include a user interface for receiving one or more inputs from a user, a display device configured for displaying a client centric user interface screen to the user, a processor, and a non-transitory memory device communicatively coupled to the processor. In some cases, the client centric viewer may and store instructions that, when executed by the processor, cause the processor to receive, from the user interface device, a client identifier corresponding to a customer of the business organization. The client centric viewer may also receive, from the first plurality and the second plurality of business application systems based on the client identifier, customer information corresponding to client interaction with each of the first plurality and the second plurality of business application systems. In some cases, the client centric viewer may analyze the customer information to determine whether the customer is eligible for a business opportunity or a business solution provided by the business organization, display, on the display device, a dashboard user interface screen configured to present at least a portion of the customer information, and display, via the dashboard user interface screen when the customer is eligible, at least one of an offered business opportunity and an offered business solution.

In some embodiments, an apparatus may include a display device, a data repository storing one or more user interface screens for display on the display device, a communication interface communicatively coupled to a network, a processor communicatively coupled to the display device, the data repository, and the communication interface, and a non-transitory memory device communicatively coupled to the processor and storing instructions that, when executed by the processor, cause the apparatus to at least obtain, via the communication interface, customer interaction information associated with a plurality of business application computing systems, wherein the customer interaction information comprises at least a product or a service offered by a business organization and utilized by the customer. The user interface may further aggregate the customer interaction information associated with the plurality of business application computing systems, identify a business opportunity for which the customer qualifies based on the aggregated customer interaction information, and display, on the display device, an overview user interface screen comprising the aggregated customer interaction information and the identified business opportunity.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein:

FIGS. 7A and 7B show illustrative portions of the centralized dashboard user interface comprising recent customer activity with one or more business applications according to one or more aspects of the present disclosure;

FIGS. 8A-8D show illustrative portions of the centralized dashboard user interface comprising recent customer activity with one or more business applications according to one or more aspects of the present disclosure;

DETAILED DESCRIPTION

Figure 1:
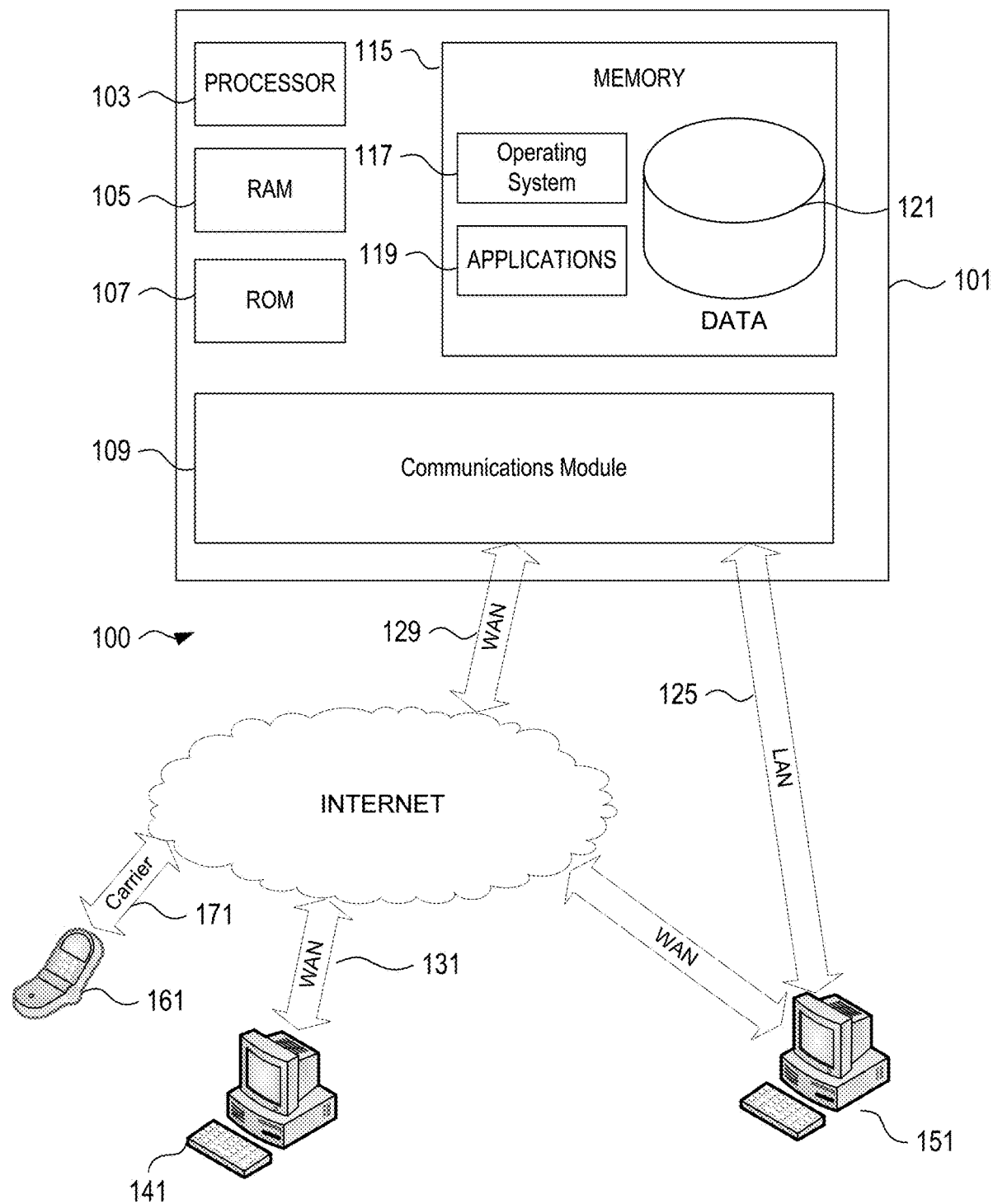
FIG. 1 shows an illustrative operating environment in which various aspects of the invention may be implemented.

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made.

A business organization, such as a financial institution, may provide one or more business functions (e.g., a banking service, a brokerage service, and the like) to employees and/or customers via a network, such as the Internet. In doing so, one or more data centers, each having one or more servers, may be configured to provide a different aspect of the business functionality. For example, a first data center located at a first geographical location and a second data center at a second geographical location may each be configured to provide at least one of a first business application, such as a banking service, a brokerage service, a combined banking service and brokerage service, a loan management service, a reporting service, a credit card service, a CRM service, a customer service application service, and/or the like.

In many cases, when an employee of the business organization attempts to view a summary of customer interactions with a plurality of business applications and/or services, each individual business application may need to be opened individually so that an accurate representation of customer activity may be identified. For example, at a financial institution, the customer's interaction with a banking service may be obtained only through direct access of the appropriate business application system Similarly, customer interaction with one or more different business application computing system may be also be done in this manner. However, by opening and individually accessing each individual business application computing system, considerable time, effort and cost may be incurred by the business organization.

In some cases, the business organization may provide user interface device that may be configured to provide an overview of customer interaction with a business organization. The user interface device may include one or more screens for viewing customer information aggregated from a plurality of business computing systems, where the business computing systems provide different business functionality. The user interface device may process the aggregated customer information to identify one or more products and/or services to offer to the customer. Based on a configuration file that may include one or more customer preferences, the identified products and/or services may be offered to the customer. In some cases, the user interface device may link to, or otherwise display, a report or a customer survey. The report and/or survey may be stored in a data repository dedicated to that type of information (e.g., a report repository, a survey repository, and the like). The report and/or survey may, in other cases, be stored in a data repository within the business computing systems. By allowing an employee to search and identify customer interaction with a plurality of business applications, a considerable savings in time and money may be seen.

FIG. 1 illustrates a block diagram of a generic computing device 101 (e.g., a computer server) that may be used according to an illustrative embodiment of the disclosure. The computer server 101 may have a processor 103 for controlling overall operation of the server and its associated components, including RAM 105, ROM 107, input/output (I/O) module 109, and a memory 115.

The I/O module 109 may include a microphone, keypad, touch screen, and/or stylus through which a user of the computing device 101 may provide input, and may also include one or more of a speaker for providing audio output and a video display device (e.g., a user interface) for providing textual, audiovisual and/or graphical output. Software may be stored within the memory 115 and/or other storage to provide instructions to the processor 103 for enabling the server 101 to perform various functions. For example, the memory 115 may store software used by the server 101, such as an operating system 117, one or more application programs 119, and an associated database 121. Alternatively, some or all of the computer executable instructions utilized by the computing device 101 may be embodied in hardware or firmware (not shown). As described in detail below, the database 121 may provide centralized storage of account information and account holder information for the entire business, allowing interoperability between different elements of the business residing at different physical locations.

The server 101 may operate in a networked environment supporting connections to one or more remote computers, such as the terminals 141 and 151. The terminals 141 and 151 may be personal computers or servers that include many or all of the elements described above relative to the server 101. The network connections depicted in FIG. 1 may include a local area network (LAN) 125 and a wide area network (WAN) 129, but may also include other networks.

When used in a LAN networking environment, the computer 101 is connected to the LAN 125 through a network interface or adapter 123. When used in a WAN networking environment, the server 101 may include a modem 127 or other means for establishing wired and/or wireless communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the server 101 according to an illustrative embodiment of the disclosure may include computer executable instructions for invoking user functionality related to communication, such as email, short message service (SMS), and voice input and speech recognition applications.

The computing device 101 and/or the terminals 141 or 151 may also be mobile terminals (e.g., a cell phone, a tablet computer, a laptop computer, a smart phone, and the like) that may include various other components, such as a battery, speaker, and/or antennas (not shown).

The disclosure is operational with numerous other general purpose or special purpose computing system environments or configurations. Examples of computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules may include routines, programs, objects, components, data structures, and the like for performing particular tasks or implementing particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 2:
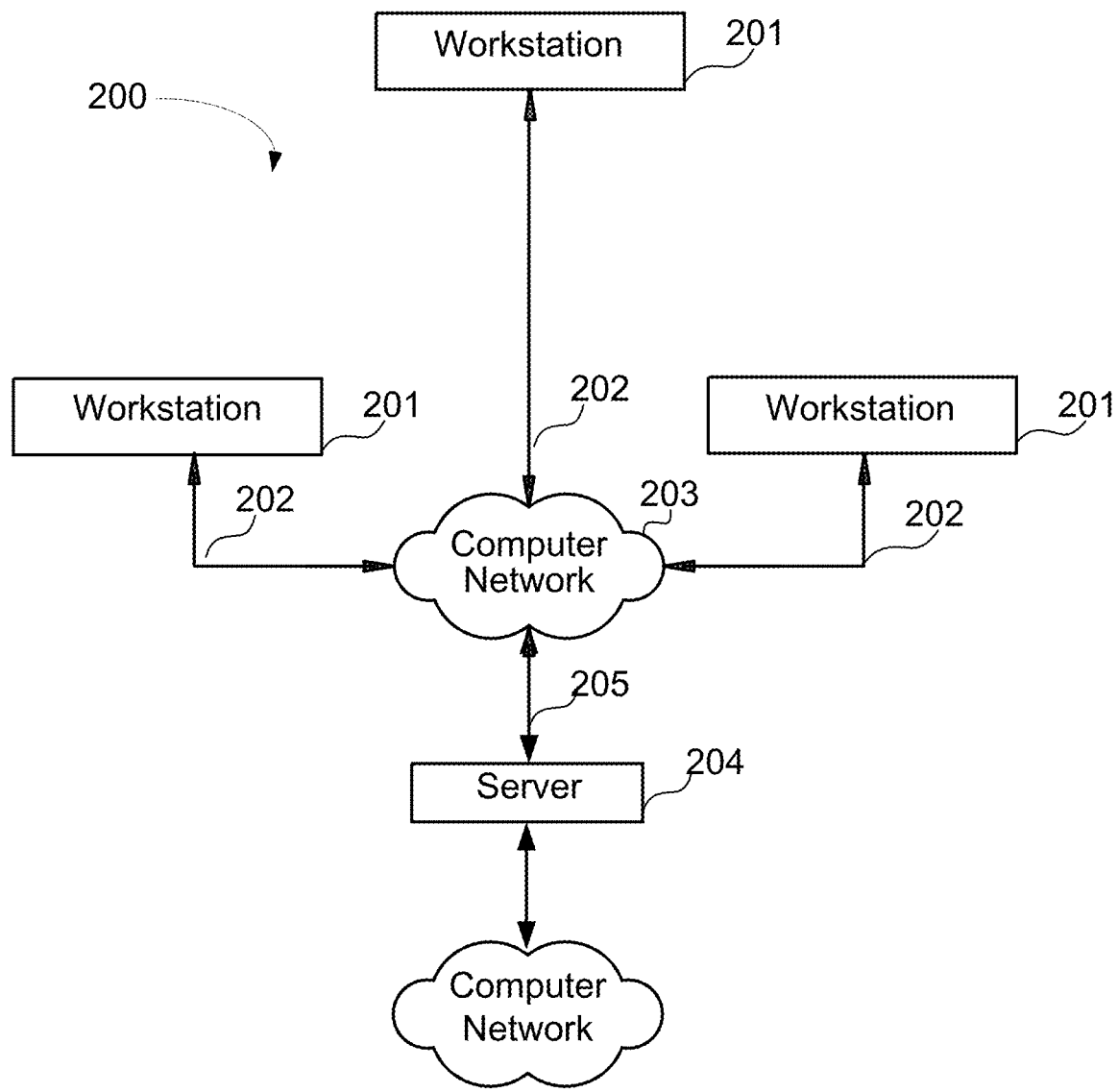
FIG. 2 is an illustrative block diagram of workstations and servers that may be used to implement the processes and functions of certain aspects of one or more aspects of the present disclosure.

Referring to FIG. 2, an illustrative system 200 for implementing methods according to the present invention is shown. The system 200 may be a risk management system in accordance with aspects of this invention. As illustrated, system 200 may include one or more workstations 201. Workstations 201 may be local or remote, and are connected by one of communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, and hard-wired links. Connectivity may also be supported to a CCTV or image/iris capturing device.

The steps that follow in the figures may be implemented by one or more of the components in FIGS. 1 and 2 and/or other components, including other computing devices.

Figure 3:
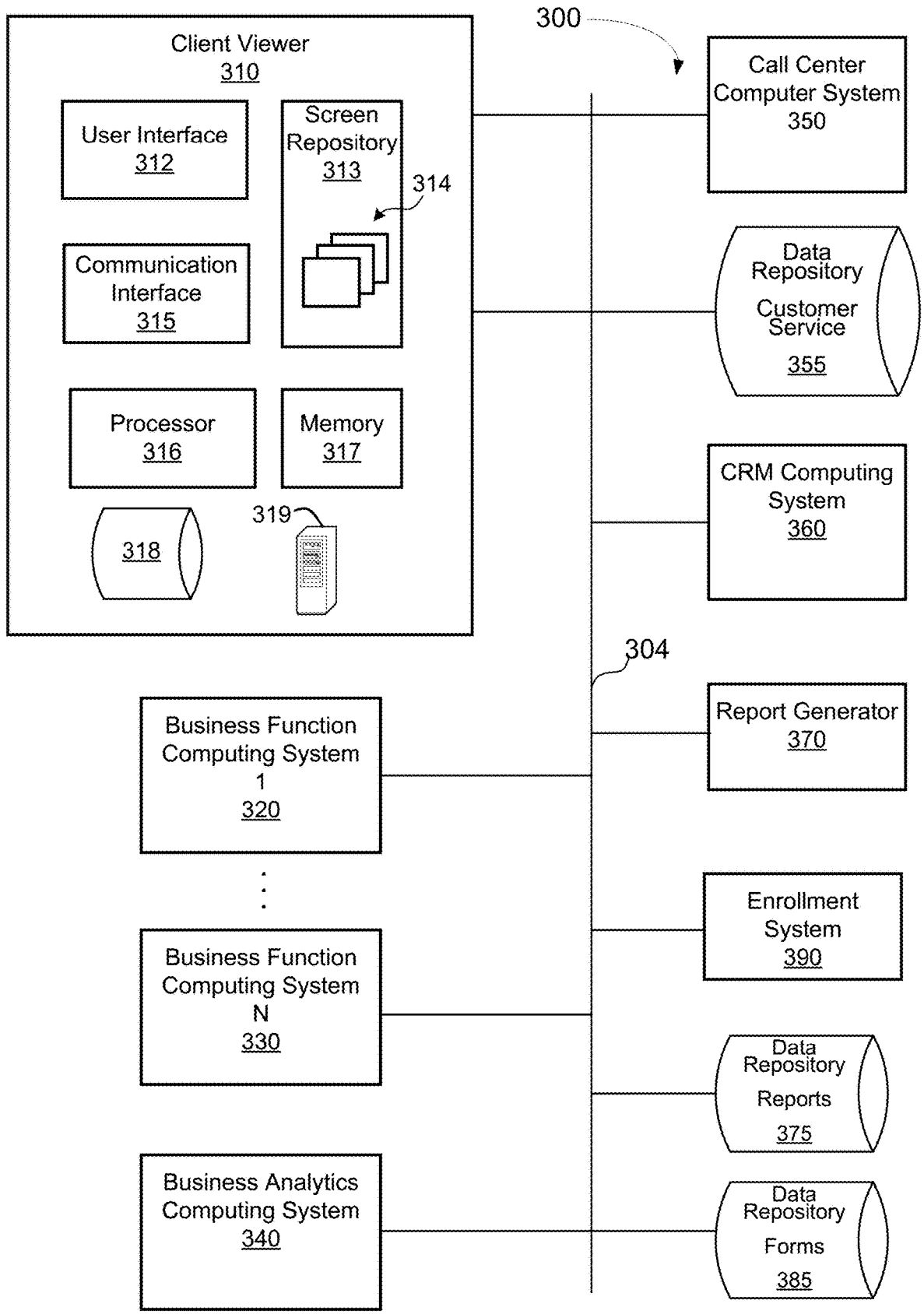
FIG. 3 is an illustrative block diagram of a system to provide a dashboard viewer summarizing client interactions and opportunities across a plurality of business applications according to one or more aspects of the present disclosure.

FIG. 3 is an illustrative block diagram of a system 300 to provide a dashboard viewer, such as the client viewer 310, to summarize client interactions and opportunities across a plurality of business applications according to one or more aspects of the present disclosure. In some cases, the client viewer 310 may be communicatively coupled via a network 204 to one or more computing systems associated with a business organization. For example, the client viewer 310 may be coupled to a plurality of computing systems (e.g., the business function computing systems 320 and 330, and the like), each configured to provide at least a portion of a business functionality. For example, the business function computing systems 320, 330 may be configured to provide one or more business functions and may include at least one of a reporting computing system, a banking computer system, a brokerage computer system, a credit card services computer system, a loan management services computer system, a customer relationship management computer system, a customer service computer system, and a retirement fund services computer system. Each of the business function computing systems 320, 330 may include one or more computing devices 101 that may be specifically programmed with software to provide a business application. For example, the business function computing system 320 may be configured to provide a banking service to customers of a financial institution. As such, the business function computing system 320 may include a data center including a login server for verifying a customer's login information, a policy server such that may be configured to provide at least a security policy for accessing the banking service, a user interface server configured to provide the banking service to the customers of the financial institution via one or more user interface screens (e.g., a bill pay screen, an account overview screen, etc.), and an application server programmed to provide one or more banking services, such as a consumer bill pay service, a monetary transfer service, and/or the like.

In some cases, the business function computer systems 320, 330 may include or be communicatively coupled to an enrollment system 390. The enrollment system 390 may include one or more computing devices configured to process instructions to receive an enrollment request (e.g., a user input received via the network 304) to enroll a customer in one or more products and/or services offered by the business organization. For example, a customer may desire to enroll in a service offered by a financial institution (e.g., a banking service, a brokerage service, a retirement account service, a combined banking and brokerage service, a loan management service and/or the like). This desire may be communicated to the financial institution as a customer entered request, through an employee of the financial institution (e.g., a financial advisor, a customer service representative, a sales person, and the like). The enrollment request may be communicated to the enrollment system 390 for processing. In some cases, the enrollment system may independently enroll the customer in the desired product and/or service. In other cases, the enrollment system 390 may communicate with one or more of the business functions systems 320, 330 to process the enrollment request. In an illustrative example, the enrollment system may receive information about enrollment information that may be required to enroll the customer in the desired product or service. This enrollment information may be received from the client, from an employee of the financial service, or from one or more data repositories and/or computing systems included in the system 300. Once collected, the enrollment system 390 may process the enrollment information to enroll the customer in the desired product or service. In other cases, the enrollment system 390 may communicate at least a portion of the enrollment information to the appropriate business function systems 320, 330 for further enrollment processing.

In many cases, one or more the business organization may require one or more forms to be filled out before providing a particular product or service to the customer. In some cases, the forms may be required due to regulatory reasons. In other cases, the forms may be required due to one or more internal rules and/or procedures of the business organization. These forms may be stored in individual data repositories associated with each business function computing system 320, 330. In other cases, the forms may be stored at a central location and may be accessible by one or more different users via the network 204.

In some cases, the system 300 may further include a business analytics computing system 340 that may include one or more computing devices (e.g., servers, data centers, etc.) configured to analyze consumer interactions with the one or more computing systems and/or to analyze consumer data associated with the one or more business function computing systems 320, 330. For example, in reference to a financial institution, the business analytics computing system may be configured to generate reports associated with one or more consumer accounts. For example, the business analytics computing system 340 may be configured to generate one or more types of wealth management reports based on a number of consumer accounts known to the financial institution and/or on different consumer goals input into the system. In an illustrative example, the business analytics computing system 340 may generate a wealth management report corresponding to a retirement plan of a particular customer based on one or more retirement goals identified by the consumer and information associated with one or more investment, retirement and/or banking accounts held by the consumer at the financial institution. These reports may be generated automatically and/or in response to an input received from a user (e.g., the consumer, a financial advisor, etc.) by a report generator 370. The reports may then be stored in a data repository (e.g., the reports data repository 375) for later viewing.

In some cases, the business organization may include a consumer call center and/or customer service group to coordinate communications with the consumer. In some cases, the call center may be used primarily for contacting consumers, such as to offer a product or service to a consumer. In other cases, the call center may be used to contact a consumer to fulfill a previously agreed upon contract, such as in response to a service or product being provided to the consumer, such as for bill collection. In some cases, the call center computing system 350 may be located at single geographical location, or distributed between different geographical locations. For example, a business organization may concentrate call center activities to one or more specified call center locations, where the call center computing system 350 may be physically located in a data center at that particular geographic location. In other cases, the business organization may use a distributed model for contacting customers. For example, a financial institution may employ representatives in a plurality of markets local to different consumers. For example, a financial institution may have one or more local branches or offices that a consumer may visit, or otherwise contact (e.g., by telephone, by email, by text message, and the like). As such, the call center computer system 350 may be accessible to employees at the local branches or offices so that the record of client communications may be accessible to a user (e.g., a loan officer, a financial advisor, and the like) at different local offices, such as by using a customer service data repository 355. In some cases, the business organization may desire to gauge consumer satisfaction with one or more product or service offerings. As such, the call center or customer service department, or other such group associated with the business organization (e.g., a sales group, a marketing group, an outside consultant, and the like) may generate surveys to be sent to a plurality of consumers. A record of the completed surveys and/or the surveys that were incomplete and/or not returned may be stored the customer service data repository 355 for use by different business units of the business organization.

The system 300 may further include a client relationship management (CRM) system 360. The CRM system may be used to manage interactions between employees of the business institution and customers, both existing and potential new customers. The CRM system 360 may include one or more applications processed by one or more computing devices to organize different business functions, such as by coordinating sales, marketing, customer service and/or technical support efforts. The CRM system may comprise one or more applications to aggregate customer contact information and to derive key performance indicators associated with the customer contact information.

As discussed above, the business organization may desire to provide employees (e.g., a financial advisor) with a simplified way to monitor customer interactions with the different business applications providing products and/or services to customers. Further, the business organization may desire to provide the financial advisor with access to reports (e.g., wealth management reports) generated in reference to the different products and/or services. For example, rather than generating a new report, the financial advisor may be allowed to leverage existing reports stored in the reports data repository 375. Further, based on this information, the financial advisor may contact the customer directly to offer advice to the customer as to products and/or services that may be of interest to a particular customer. Rather than accessing each computing system 320, 330, 340, 350, 360 and/or data repository 355, 375, 385 individually, the client viewer 310 may be configured to provide aggregated customer information via a dashboard user interface screen.

The client viewer 310 may include a user interface 312, a screen repository 313 storing one or more user interface screen templates 314, a communication interface 315, one or more processors, one or more non-transitory memory devices, and a data repository 318. In some cases, the client viewer 310 may be implemented using one or more computing devices 319. The one or more computing devices (e.g., servers, work stations, and the like) may be located at a specified geographical location and provide the user interface screens via a network (e.g., the Internet, a WAN, a LAN, and the like). In other cases, the client viewer functionality may be instantiated on individual computing devices (e.g., workstations, mobile devices, tablet computers, laptop computers, personal computers, and the like) at a plurality of locations. For example, each financial advisor may have an instance of a client viewer application installed on a local computing device.

The user interface 312 may include one or more user interface devices that may be used to facilitate user interaction with the client viewer 310. For example, the user interface may include a display device (e.g., a video display device, a touch screen device, an LED display device, an LCD display device, and the like), an input device (e.g., a mouse, a touchscreen, a keyboard, a keypad, and the like), and/or an output device (e.g., a printer and the like). The display of the user interface 312 may be used to display one or more user interface screens based on one or more user interface screen templates 314 stored in the data repository. In some cases, the one or more instances of user interface screens may be stored in the screen repository 313. For example, the user interface screens may be designed and/or tested before deployment. In other cases, the screen repository 313 may store user interface screen templates 314 that may be used to generate a user interface screen for display to a user via the user interface. Illustrative examples of user interface screens and/or user interface screen templates may include a client centric view user interface screen for displaying an overview of client interactions with one or more business computing systems and opportunities for additional products and/or services that may be offered to the consumer. In some cases, the user interface screens may be used to display one or more alerts or other action items that may need corrective actions to resolve. Illustrative user interface screens are discussed below in reference to FIGS. 6-14.

The communication interface 315 may include a network interface for communicatively coupling the client viewer to the network 304. The network 304 may include the Internet, a WAN, a LAN or other such communication network. The processor 316 may be configured to process instructions stored in the one or more non-transitory memory devices 317 to obtain information from the plurality of computing systems 320, 330, 340, 350, 360, 370 and/or data repositories 355, 375, 385. The obtained information may be stored in the data repository local to the client viewer 310

In some cases, the information may be obtained via the network 304 in response to a request from a user (e.g., a financial advisor, and the like) received via the user interface 312. Sometimes, the client viewer 310 may be configured to update stored client communication information automatically. In some cases, the client viewer 310 may be configured to update the client information stored in the data repository in near real time, on a periodic basis, and/or the like.

Figure 4:
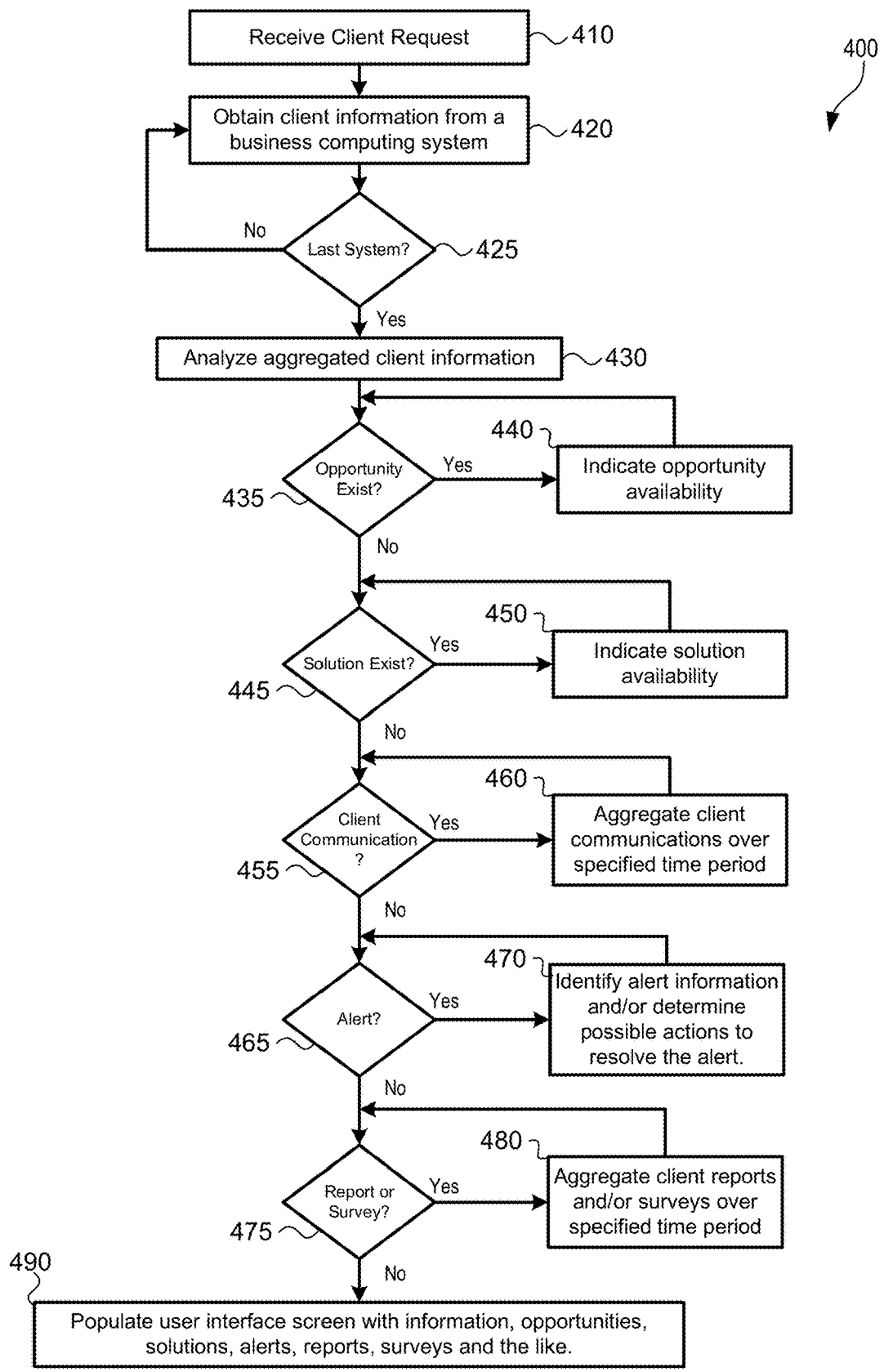
FIG. 4 is a flowchart of an illustrative method for displaying aggregated information from a plurality of business applications on a centralized dashboard user interface screen according to one or more aspects of the present disclosure.

FIG. 4 is a flowchart of an illustrative method 400 for displaying aggregated information from a plurality of business applications on a centralized dashboard user interface screen (e.g., the client centric view user interface screen) according to one or more aspects of the present disclosure. At 410, the client viewer 310 may receive a request to view information corresponding to a particular client. For example, a financial advisor may access a client request user interface screen to enter a customer identifier (e.g., a name, an account number, a phone number, an email address, and the like) associated with a particular customer. At 420, the client viewer 310 may obtain information corresponding to the particular customer. For example, the client viewer 310 may query one or more of the business function computer systems 320, 330 for information associated with the received customer identifier. In some cases, information stored in the local data repository may be overwritten and/or supplemented with new data received from one or more of the business function computer systems 320, 330. Such information may include a plurality of consumer contacts (e.g., phone calls, emails, letters, web page views, and the like), times of such contact, account information, account balances, subscribed products, and the like. At 425, the client viewer 310 may check to see whether the last relevant computing systems have been contacted. If not, a next business computing system may be contacted at 420 to obtain information corresponding to the user identifier.

If information has been received from the last business computing system, the client viewer 310 may analyze the obtained information. In some cases, the client viewer may provide information to and/or receive analyzed information from the business analytics computing system 340. In other cases, the client viewer 310 may be configured to perform similar analytics to those done by the business analytics computing system. For example, the client viewer 310 may analyze account information (e.g., balances, holdings, and the like) associated with banking and/or brokerage accounts held by a customer. If a threshold condition (e.g., minimum account balance amounts, or the like) has been met, the client viewer 310 may indicate that an opportunity exists for the consumer to open a combined brokerage and banking account. In some cases, the client viewer may analyze information associated with retirement, or other such accounts, along with applicable government regulations, to determine whether a required minimum distribution (RMD) may be required to be taken before a specified date. In some cases, the client viewer 310 may analyze one or more accounts to determine whether one or more features have been utilized by the customer. For example, the client viewer may identify that the customer has one or more banking or brokerage accounts, but is not taking advantage of one or more products or services associated with those accounts. For example, the client viewer may identify that a customer is not enrolled in, or is not meeting a minimum requirement associated with, a particular service. For example, the client viewer may identify that a consumer has not enrolled, or is not meeting a minimum requirement associated with a direct deposit service and/or a funds transfer service.

In some cases, the client viewer 310 may analyze the obtained information to identify one or more solutions to issues, or potential issues identified using the obtained information. For example, the client viewer 310 may identify an opportunity to offer a managed product solution to a customer. In other cases, the client viewer 310 may identify that the customer does not currently have a loan (e.g., a vehicle loan, a home loan, and the like). In some cases, the client viewer may identify one or more potential problems associated with one or more accounts. For example, the client viewer 310 may analyze account information in reference to one or more business rules and/or regulations associated with those particular kinds of accounts. For example, an account may include regulations associated with a minimum balance amount, an anticipated funds amount, a daily deposit amount, a credit balance amount, etc. If a particular criterion has been met (e.g., an account balance approaching a minimum balance amount), the client viewer may issue an associated alert.

At 435, the client viewer 310 may determine whether an opportunity (e.g., a sales opportunity) exists based on the analyzed customer information. For example, the client viewer may have identified an opportunity to offer enrollment in a combined brokerage and banking account based, at least in part, on account balance amounts associated with existing accounts. If the opportunity exists, then at 440, the client viewer 310 may mark the opportunity for inclusion on the dashboard user interface screen and then check to see if further opportunities are available at 435. If not, at 445, the client viewer may check to see if, based on the analyzed customer information, a business solution exists. If so, at 450, an entry corresponding to the solution may be marked for inclusion on the dashboard user interface screen. If not, at 455, client communications that occur within a specified time frame (e.g., within about 2 month, within about 2 months, within about 1 year) with the one or more business computer systems are analyzed and aggregated. For example, a number of correspondences and/or calls to a call center may be identified by the client viewer. If client communications have been recognized, information about the client communications may be marked for inclusion on the dashboard user interface screen. If not, at 465, the client viewer 310 may analyze the customer information to determine whether an alert should be identified to the employee (e.g., the financial advisor). If so, at 470, each alert may be marked for inclusion in the dashboard user interface screen. If not, at 475, the client viewer may determine whether one or more reports (e.g., a wealth management report) or surveys (e.g., a customer satisfaction survey) are available. If so, at 480, the appropriate reports and/or surveys may be marked for inclusion or linking to in the dashboard user interface screen. At 490, the client viewer may populate the dashboard user interface screen with information associated with one or more marked opportunities, solutions, client communications, alerts, reports, and/or surveys. In some cases, a customer may not desire to hear about one or more available business solutions and/or services. For example, the customer may rent an apartment and may have no desire for a home loan. As such, a home mortgage opportunity may not be marked for inclusion on the dashboard user interface screen based on customer configuration information that may be stored in the data repository 318.

While the steps of determining whether an opportunity exists at 435, determining whether a solution exists at 445, determining whether a client communication has occurred at 455, determining whether an alert should be issued at 465 and determining whether a report or survey exists at 475 for the selected client are shown to be performed in series, one or more of the steps 435, 445, 455, 465, and 475 may be performed in parallel. For example, the client viewer 310 may be configured to determine whether an opportunity and/or a solution exists in parallel operations. In another example, the client viewer 310 may query information from one or more databases, such as the customer service data repository 355 and the reports data repository 375, in parallel operations. These examples are illustrative and one or more other of the above-mentioned operations may be performed in parallel, in series or in a combination of parallel and series operations.

Figure 5:
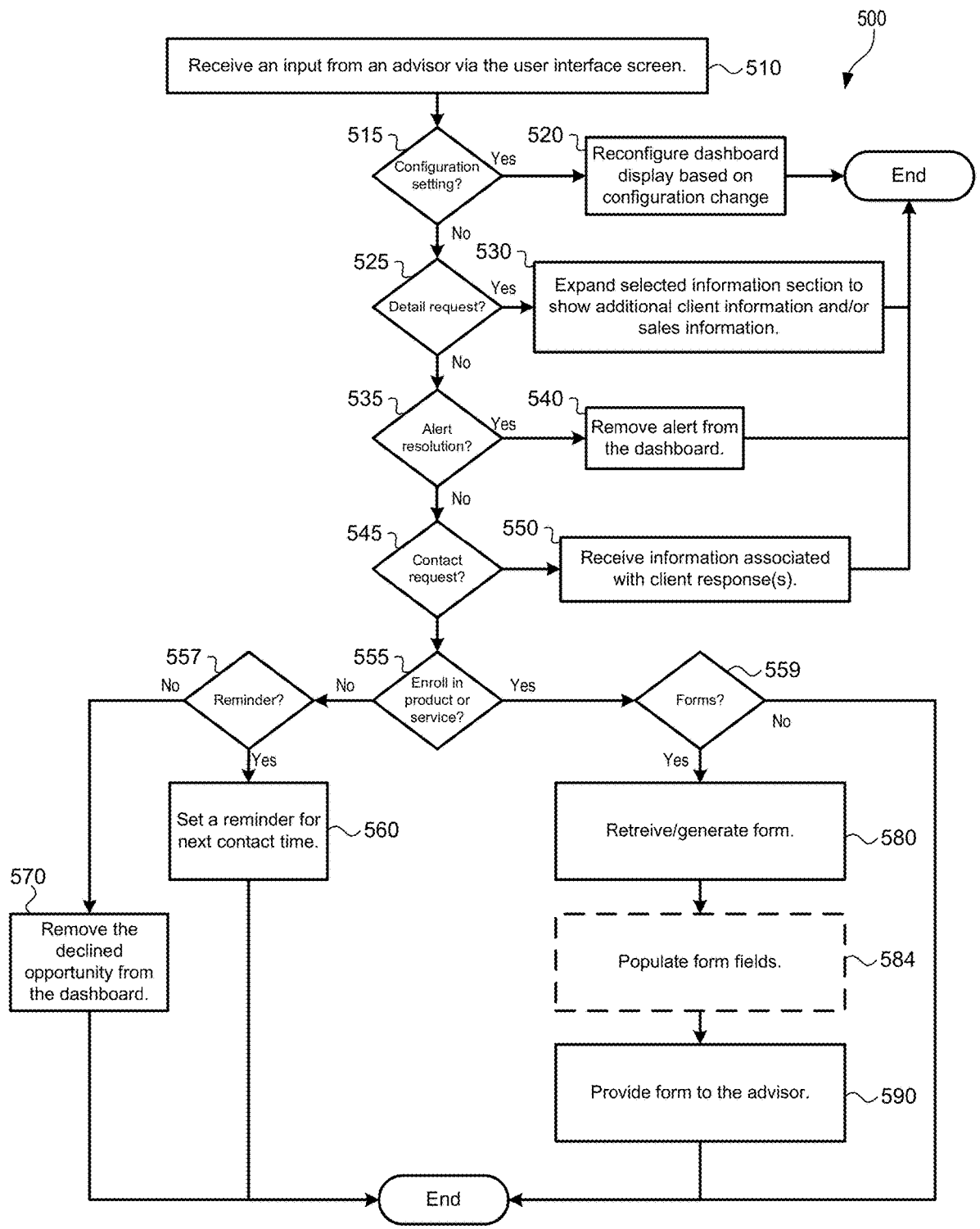
FIG. 5 is a flowchart of an illustrative method to facilitate user interaction with the centralized dashboard user interface screen according to one or more aspects of the present disclosure.

FIG. 5 is a flowchart of an illustrative method 500 to facilitate user interaction with the dashboard user interface screen according to one or more aspects of the present disclosure. At 510, the client viewer 310 may receive an input, via the user interface 312 of the client viewer 310 from a user. At 515, the input may be checked by the client viewer as to whether a configuration setting has been changed, if so, the client viewer 310 may reconfigure the dashboard user interface screen based on the configuration change. For example, the configuration change may add or remove one or more business solutions to the dashboard user interface screen and the method ends. If the input is not a configuration setting, the input is checked as to whether the user (e.g., a financial advisor) has requested to show more information corresponding to client communication information and/or sales information at 530 and the method 500 ends. If, however, the alert indicates an alert resolution at 535, the alert may be removed from view on the dashboard user interface screen. If not, the client viewer 310 checks, at 545, as to whether the input corresponds to a request for contact information associated to the client. If so, at 550, client contact information may be obtained from a data repository (e.g., the data repository 318, the customer service data repository 318, and the like)

In some cases, the client viewer 310 may determine whether the customer input corresponds to an enrollment in a product or service offered by the business organization. For example, at 555, the client viewer may determine that a customer desires to enroll and send an enrollment request to the enrollment system 390 along with additional enrollment information. In some cases, the enrollment system 390 may be a separate computing system. In other cases, at least a portion of the enrollment system may be incorporated within one or more different business computing systems (e.g., the business function computing systems 320, 330). At 559, the client viewer 310 may determine whether one or more forms may be required for enrollment in the product or service. If so, at 580, the client viewer may obtain the form from the forms data repository 385, optionally populate one or more form fields using the aggregated information at 584, and provide the form to the financial advisor 590.

If, however, the client viewer 310 determines that the input does not correspond to an enrollment in a product or service, the client viewer 310 may identify whether the user intended to set a reminder to be contacted at a future date at 557, if so, the reminder may be set by the client viewer at 560. If so, then the request has been declined, the declined opportunity may be removed or otherwise prevented from being included in the dashboard user interface screen.

Figure 6:
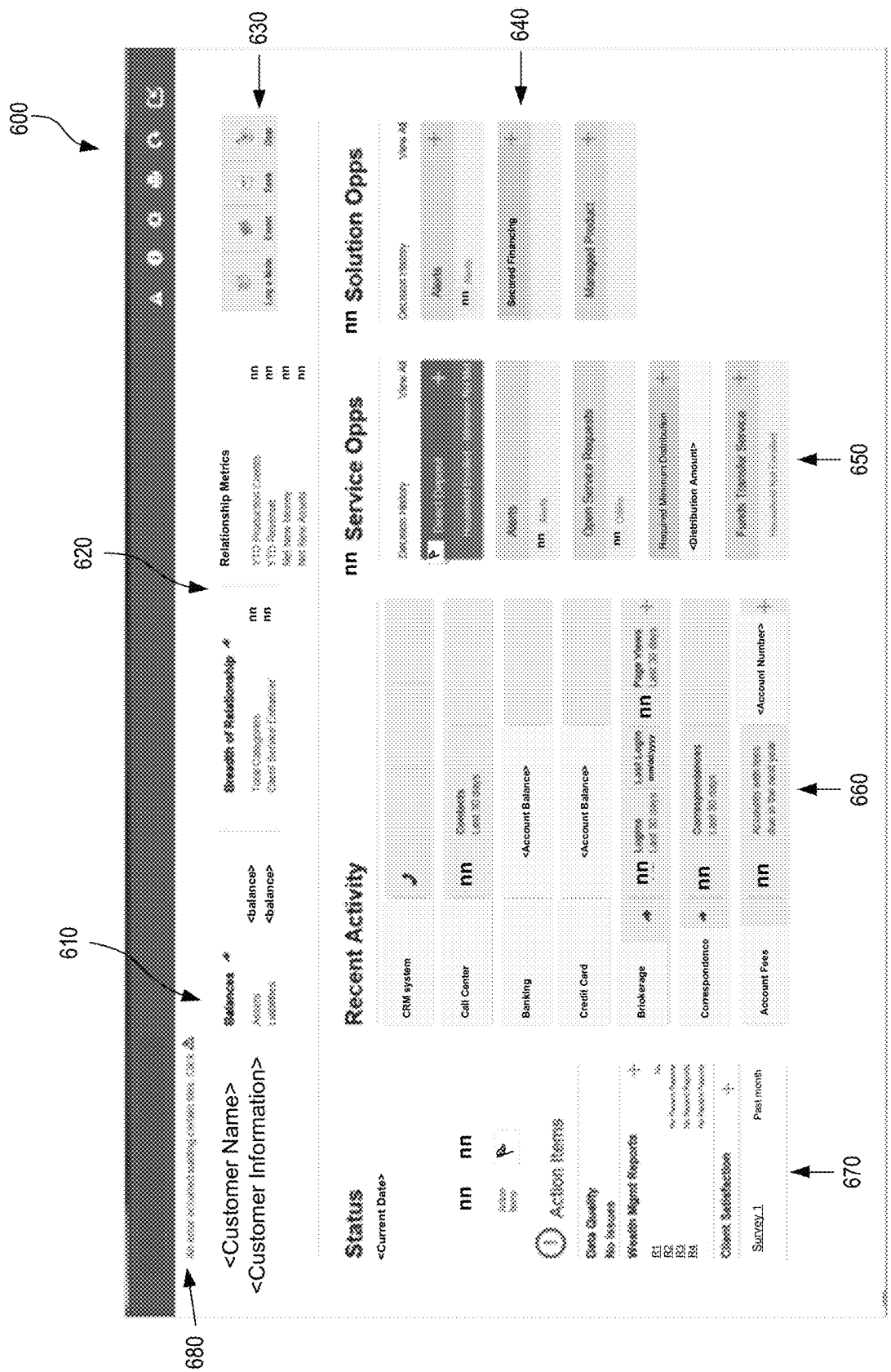
FIG. 6 shows an illustrative centralized dashboard user interface for viewing information obtained from a plurality of business applications according to one or more aspects of the present disclosure.
Figure 8D:
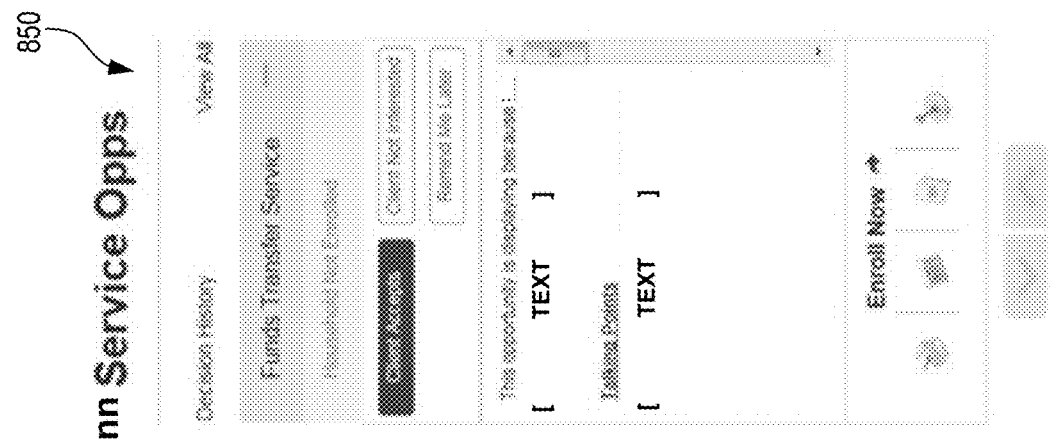
Figure 8C:
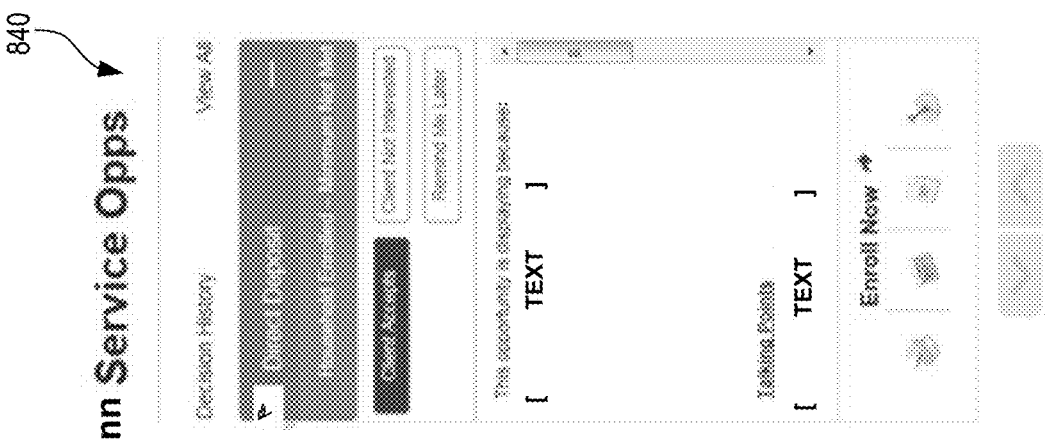

FIG. 6 shows an illustrative dashboard user interface 600 for viewing information obtained from a plurality of business applications according to one or more aspects of the present disclosure. The dashboard user interface screen 600 may comprise one or more sections dedicated to providing certain information to the user (e.g., the financial advisor). For example, the dashboard user interface screen 600 may include a customer information section 610, a business summary section 620, an action section 630, a business solution section 640, a business opportunity section 650, a customer activity summary section 660, a status section 670 and/or an alert message section 680.

In some cases, the customer information section 610 may include a customer name, an account number, an address, and/or account balance information. For example, the account balance information may include an asset summary section and a liability summary section. The business summary section 620 may include one or more business metrics that provide the financial advisor viewing the dashboard user interface screen 600 with information about one or more business metrics describing a business relationship between the customer indicated in section 610 and the financial institution. For example, the business analytics system 340 may identify a breadth or the relationship between the particular customer and the financial institution including a number of business categories in which the customer interacts with the financial institution (e.g., a brokerage account, a retirement account, and the like). In some cases, the dashboard user interface screen 600 may identify one or more business metrics associated with the business relationship, including year to date sales metrics (e.g., production credits, revenue, and the like) and/or an amount of money (e.g., net new money, net new assets) added and/or removed to/from the accounts associated with the customer.

In the action section 630, one or more icons may be available to a financial advisor to provide one or more functions. For example, the options included in the action section may include an option to log a note, to add an event, to create a task and/or to initiate an opportunity. In some cases, the dashboard user interface screen may include a menu bar including commonly included features associated with a business application and/or user interfaces. For example, the menu bar may include an alert button to set an alert or to view existing alert. In some cases, the opportunity button may initiate an acceptance of an opportunity or, conversely, reject one or more opportunities associated with the user interface as shown in section 650.

At Section 640, the dashboard user interface may include one or more (e.g., up to, and including 7) one or more solution opportunities associated with the client viewer 310. For example, the solution opportunity selection comprises at least one of an alert, a home financing option.

Section 650 shows one or more service opportunities associated with the customer information. For example, the illustrative section 650 identifies a direct deposit opportunity, a required minimum distribution (RMD) opportunity, a funds transfer service opportunity, and the like. The customer activity section 660 may be used to display a summary of customer contact information. In some cases, the dashboard user interface screen 600 may be configured to minimize the displayed business systems associated with the customer. For example, the CRM system, the call center computer system, the banking system, the credit card opportunity section, a brokerage section, a correspondence section and an account fee section. The status section 670 may include one or more action items, and/or one or more flagged entries (e.g., a direct deposit entry). In some cases, the status section may include one or more action items that may include a data quality action item, a wealth management data report and/or a customer satisfaction survey. In some cases, the data quality section may not include any information necessary for upgrade or inclusion with the accounts, as shown in the dashboard user interface screen.

FIGS. 7A and 7B show illustrative portions of the centralized dashboard user interface comprising recent customer activity with one or more business applications according to one or more aspects of the present disclosure. For example, the recent activity section 700 includes a summary section 710 and an expanded communication details section 720. For example, in section 720, a number of times that a customer has accessed a brokerage account may be indicated. In the illustrated example, the customer logged in twice in the last 30 days, where the last login corresponds to a specified date and that the customer has logged 8 page views over that same timeframe. More details regarding the client communication may be provided in the expanded information section 720. Here, we see that the user logged in under a particular user name twice in the last 30 days, where a total of 8 views were made of the portfolio and accounts pages via the user interface. The recent activity section of 720 corresponds to customer activity regarding account fees associated with a particular user account. In this instance, the recent activity section 720 identifies an account where fees are due in the next time period, a fee amount and a required due date. In some cases, such as in the illustrative case, additional information outlining opportunities that may be available in a "talking points" section associated with the account fees that may provide highlights and shortcuts that may be used to assist a customer in making a decision regarding the user interface.

FIGS. 8A-8D show illustrative portions of the dashboard user interface screen comprising recent customer activity with one or more business applications according to one or more aspects of the present disclosure. In some cases, such as in the solutions sections 630, a minimized version of the identified opportunities may be shown. By expanding the identified service opportunities, such as in service opportunities sections 820, 840, 860, and 880 the dashboard user interface screen 600 may show notes, talking points and/or other information of user to the financial advisor when deciding whether to present the identified product to the customer. Service opportunity section 820 identifies a service opportunity corresponding to a combined brokerage and banking account. Here, the financial advisor may be able to present the opportunity to a client using the talking points indicated in the expanded notes section. In some cases, the service opportunity section may allow for the financial advisor to indicate whether the customer accepts the opportunity, declines the opportunity, or asks to be reminded at some time in the future in section 825. One or more other buttons may be included to allow a user to enter notes, schedule a reminder, or perform other such activity in section 827.

In the service opportunity section of 830, the user interface identifies a required minimum distribution (RMD) associated with a particular account. Here this opportunity allows a financial advisor to speak about the RMD with the client to ensure the customer is fully informed about his/her options. In service opportunity section 840, a direct deposit opportunity has been identified. Here, while the opportunity may be available, or the customer may be currently enrolled in the direct deposit program, an indication that a required minimum deposit amount has not been met. The service opportunity section 850 identifies an opportunity to participate in a funds transfer service, if the customer so desires.

Figure 9:
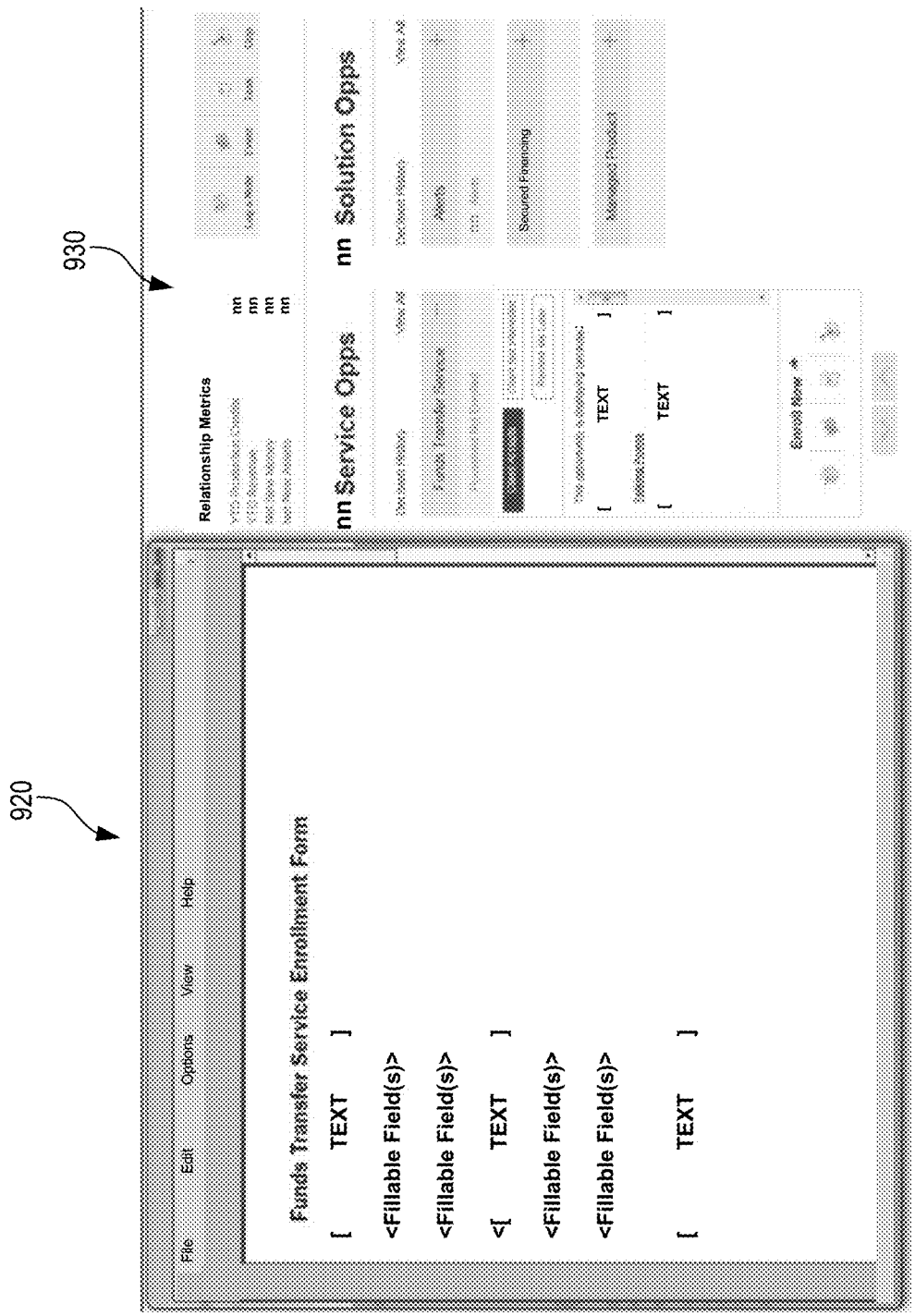
FIG. 9 shows an illustrative portion of the client viewer user interface and a form viewer user interface corresponding to a selected customer opportunity, according to one or more aspects of the present disclosure.

FIG. 9 shows an illustrative portion of the client viewer user interface and a form viewer user interface corresponding to a selected customer opportunity, according to one or more aspects of the present disclosure. In some cases, such as when the business opportunity requires one or more forms, the client viewer 310 may provide a user interface screen to view and/or fill out one or more required forms. In the illustrative example, the user interface display includes both a file viewer screen 920 and the dashboard user interface screen 930. In some cases, the forms may be fillable forms so that a financial advisor may ensure the forms are complete as of a time of enrollment into the service opportunity (e.g., a funds transfer service). In some cases, the client viewer 310 may auto-populate at least a portion of the forms using information obtained from the aggregated client information that may be stored in the data repository 318.

Figures 10A, 10B, 10C:
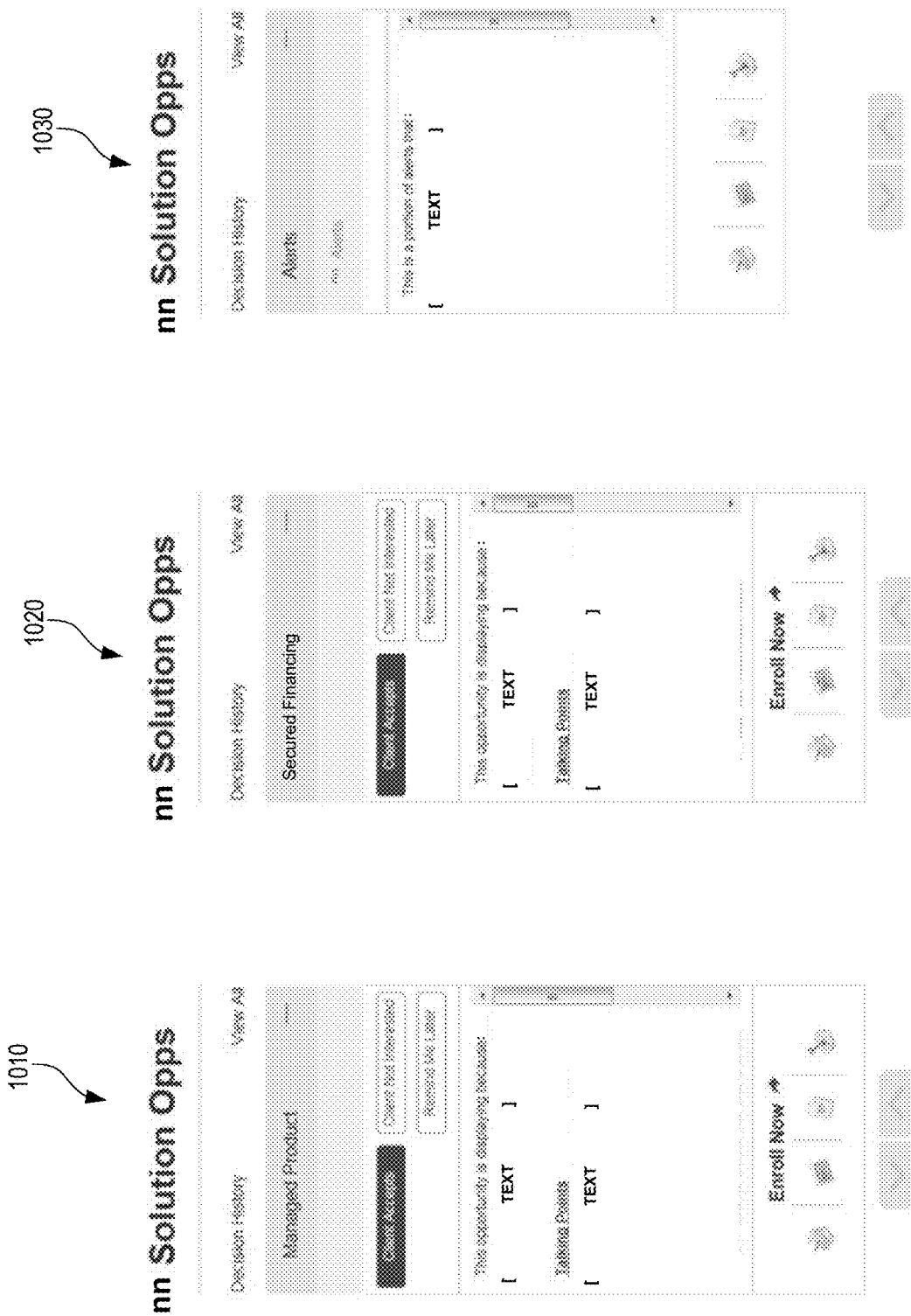
FIGS. 10A-10C show illustrative portions of the centralized dashboard user interface comprising different product and/or service solutions identified by the client viewer based on the customer information according to one or more aspects of the present disclosure.

FIGS. 10A-10C show illustrative portions of the dashboard user interface comprising different product and/or service solutions identified by the client viewer based on the customer information according to one or more aspects of the present disclosure. Here three possible solutions are shown, including a managed product opportunity 1010, a home financing opportunity 1020, and an alert opportunity 1030. Here, a financial advisor may also have an option to accept, decline or postpone a decision to enroll in the particular identified opportunities 1010, 1030. In the alert opportunity 1030, the client viewer identified a portion of an alert that may require user input to correct. For example, a hyperlinked account number may be provided to access the account causing the alert.

Figures 11A, 11B, 11C:
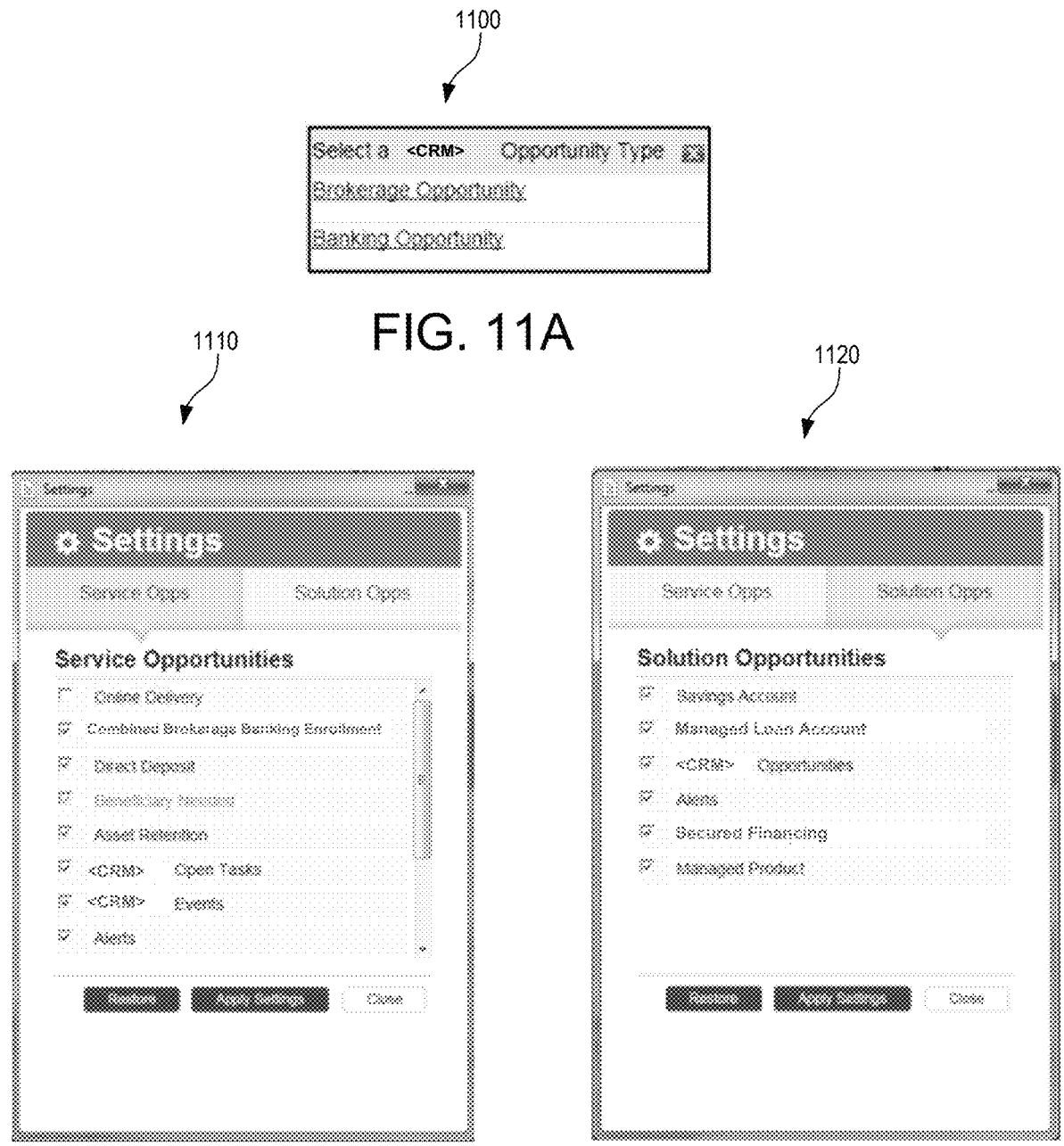
FIGS. 11A-11C show illustrative portions of the centralized dashboard user interface corresponding to settings to allow customization of information displayed to the viewer of the centralized dashboard user interface according to one or more aspects of the present disclosure.

FIGS. 11A-11C show illustrative portions of the dashboard user interface corresponding to settings to allow customization of information displayed to the viewer of the centralized dashboard user interface according to one or more aspects of the present disclosure. The client viewer 310 may be configured to provide one or more user interface screens for customizing a display of the dashboard user interface screen. For example, a configuration selection screen 1110 may be provided to a user. The opportunity type may include a brokerage opportunity or a banking opportunity to be selected. In some cases, the settings may include one or more configuration options that may be available to the financial advisor using the configuration screens 1110, 1120. For example, the service opportunities options may allow for selecting different opportunities to be selected to be shown via the dashboard user interface screen. For example, the financial advisor may elect to selectively display, when identified by the client viewer, online delivery options, combined brokerage and banking enrollment option, a direct deposit opportunity, a beneficiary requirement, an asset retention opportunity, a CRM opportunity, and/or alerts. In some cases, the solution opportunities may include one or more of a savings account opportunity, a managed online account, a home financing opportunity, and/or a managed account opportunity.

Figure 12:
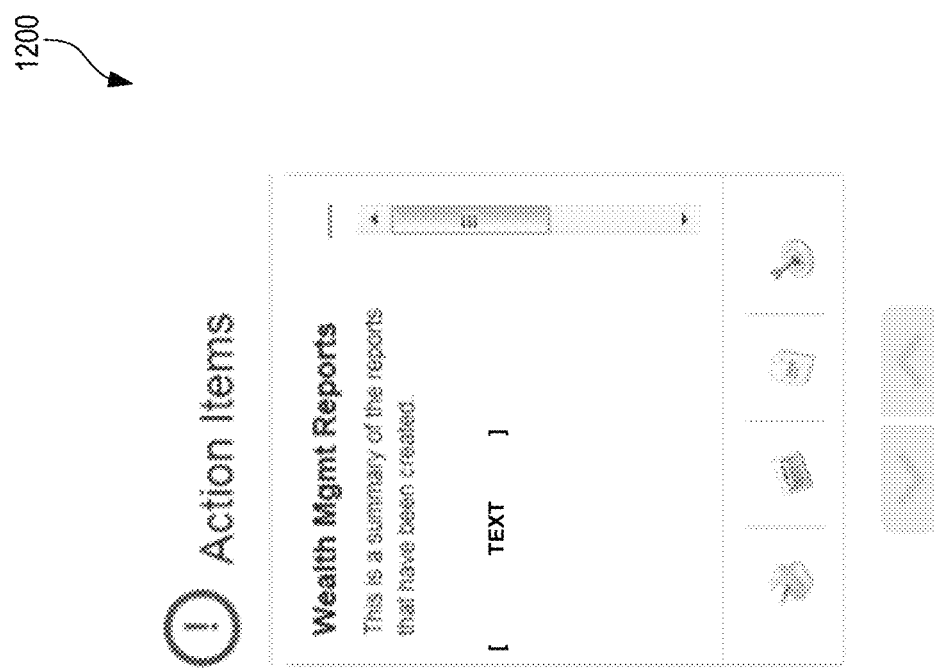
FIG. 12 shows an illustrative portion of the centralized dashboard user interface corresponding to an action item identified by the client centric viewer based on the obtained customer information according to one or more aspects of the present disclosure.

FIG. 12 shows an illustrative portion of the dashboard user interface corresponding to an action item identified by the client centric viewer based on the obtained customer information according to one or more aspects of the present disclosure. In some cases, the action item section may include one or more action items identified by the client viewer 310. For example, a wealth management report action item may include help information to assist users unfamiliar with the wealth management report format and help those individuals understand an age of the health management report.

In some cases, an illustrative report may be generated by the client viewer 310 via the centralized dashboard user interface according to one or more aspects of the present disclosure. In some cases, the client viewer 310 may be capable of providing copies of a report associated with the dashboard user interface screen via a user display, a printer, or other output device. In some cases, the client viewer 310 may provide a link to a report stored in a centralized location, such as the reports data repository 375. The client viewer 310 may also provide the report, or a link to the report, via a message such as by using an email, a text message, a physical mailing, and/or the like. This report may be helpful in assisting the financial advisor decide an action plan to associated with the particular customer by providing offline access to information identified and analyzed by the client viewer 310. A help file associated with the client viewer computer system and accessible through the centralized dashboard user interface according to one or more aspects of the present disclosure. The help file may be accessible to a financial advisor via an input on the user interface device and may include help information associated with one or more of accessing the dashboard user interface screen, interpreting client information and identified action items. The help file may further assist the user in identifying action items that may need to be acted upon. The help file may provide further information about possible service opportunities (e.g., online delivery, brokerage account enrollment, direct deposit, beneficiary needed, asset retention, CRM system open tasks, alerts for service, open service requests, funds transfer service, combined brokerage and banking accounts and a required minimum distribution. In some cases, the solution opportunities may include a savings account, a loan management account, outflows, CRM based opportunities, alerts-solution, home financing and/or related protocol.

Although not required, one of ordinary skill in the art will appreciate that various aspects described herein may be embodied as a method, a data processing system, or as a computer-readable medium storing computer-executable instructions. Accordingly, those aspects may take the form of an entirely hardware embodiment, an entirely software embodiment or an embodiment combining software and hardware aspects. For example, a computer-readable medium storing instructions to cause a processor to perform methods in accordance with aspects of the disclosure is contemplated.

While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present disclosure. The description is thus to be regarded as illustrative instead of restrictive on the present disclosure.

What is claimed is:

1. Computer-readable media storing computer-executable instructions that, when executed by a computing device comprising a client centric viewer, cause:
    receiving, via a user interface, a client identifier identifying a customer of a business organization;
    requesting from each of a plurality of business application computing systems, utilization information corresponding to products and services offered by the business organization and used by the customer;
    receiving, via a network from each of the plurality of business application computing systems, the utilization information corresponding to customer usage of the products and services offered by the business organization;
    aggregating the utilization information received from each of the plurality of business application computing systems;
    analyzing aggregated utilization information to identify a business opportunity for the business organization to offer to the customer;
    displaying, on a display device associated with the client centric viewer, at least a portion of the utilization information obtained from the plurality of business application computing systems in a first section of client dashboard user interface screen and the identified business opportunity in a second section of the client dashboard user interface screen;
    receiving, via a third section of the user interface, an indication that the client has accepted an offered business opportunity;
    displaying, on the client dashboard user interface screen by the client centric viewer, a form associated with the offered business opportunity;

determining whether the form is fillable with data associated with the plurality of business application computing systems;

filling the form with the data associated with the customer usage of the business application computing systems; and removing a reference to the offered business opportunity from the second section of the client dashboard user interface screen.

2. The computer readable media of claim 1 wherein the instructions, when executed, cause the requesting by opening at least one of a plurality of business applications associated with the plurality of the business application computing system to retrieve information about the customer usage of a particular business application.

3. The computer readable media of claim 1, wherein the instructions, when executed, cause the requesting by:

accessing, via the network, a data repository associated with one or more of the business applications; and searching the data repository to retrieve at least a portion of the customer information.

4. The computer readable media of claim 1, wherein the instructions that, when executed by a computing device comprising a client centric viewer, cause:

displaying, via the user interface, a user interface screen displaying an input field to receive an identifier of the customer from a user viewing an overview user interface screen on the display.

5. The computer readable media of claim 4, wherein the instructions that, when executed by a computing device comprising a client centric viewer, cause:

receiving an input from an input device, wherein the input corresponds to a desired action triggered by the user based on aggregated customer information displayed on the overview user interface screen.

6. The computer readable media of claim 4, wherein the instructions that, when executed by a computing device comprising a client centric viewer, cause:

receiving an input from an input device, wherein the input corresponds to a desired action triggered by the user based on aggregated customer information displayed on the overview user interface screen;

determining whether the input corresponds to a configuration request; and generating a configuration file comprising a configuration of the overview user interface screen customized for a particular customer based on the configuration request.

7. The computer readable media of claim 6, wherein the instructions that, when executed by a computing device comprising a client centric viewer, cause:

selectively displaying, based on the configuration file, one or more products or services for which the customer qualifies based on aggregated customer interaction information on the overview user interface screen.

8. The computer readable media of claim 4, wherein the instructions that, when executed by a computing device comprising a client centric viewer, cause:

displaying of the overview user interface screen associated with the customer, wherein the overview interface screen comprises a first section displaying customer account information, a second section displaying identified business opportunities, and a third section displaying identified business solutions.

9. The computer readable media of claim 1, wherein the plurality of business application computer systems comprise at least two of a reporting computing system, a banking computer system, a brokerage computer system, a credit card services computer system, a loan management services computer system, a customer relationship management computer system, a customer service computer system, and a retirement fund services computer system and the business opportunity is associated with at least one of the plurality of business application computing systems.

10. Computer-readable media storing computer-executable instructions that, when executed by a computing device, cause:

receiving, from a user interface device, a client identifier corresponding to a customer of a business organization;

querying, via a network in response to receipt of the client identifier, each of a plurality of business application computing systems for information associated with the client identifier;

obtaining, from a first plurality of business application systems and a second plurality of business application systems based on the client identifier, customer information corresponding to client interaction with each of the first plurality of business applications systems and the second plurality of business application systems and an electronic record of one or more customer contacts with the business organization;

aggregating the customer interaction information obtained from each of the plurality of business application computing systems;

comparing, aggregated customer interaction information to specified criteria to determine whether the customer is eligible for one or more business opportunities;

when a business opportunity has been identified based on the comparison, populating a first portion of the user interface screen with information associated with the identified business opportunity;

when an analysis of the aggregated customer interaction information includes an indication of missing information, generating an alert and populate a second portion of the user interface screen with alert information;

receiving, by a user interface, an input comprising an acceptance of the identified business opportunity via an input on a third portion of the user interface screen;

retrieving, upon receipt of the input, a form associated with the identified business opportunity from a forms data repository; and completing, automatically using the aggregated customer interaction information, at least a portion of the form after receiving an indication that the customer accepted the identified business opportunity by auto-populating at least the portion of the form using the aggregated customer interaction information.

11. The computer readable media of claim 10, wherein the first plurality of business application systems provides a plurality of business services to customers of a business organization and the second plurality of business application systems provides a plurality of business products to the customers of the business organization.

12. The computer readable media of claim 10, wherein the first plurality of business application systems and the second plurality of business application systems comprise at least two of a reporting computing system, a banking computer system, a brokerage computer system, a credit card services computer system, a loan management services computer system, a customer relationship management computer system, a customer service computer system, and a retirement fund services computer system.

13. The computer readable media of claim 10, wherein the instructions that, when executed by a computing device comprising a client centric viewer, cause:

receiving, via an input device associated with a user interface device, an identifier of the customer from a user viewing the user interface screen on a display.

14. The computer readable media of claim 13, wherein the instructions that, when executed by a computing device comprising a client centric viewer, cause:
   receiving an input from the input device, wherein the input corresponds to a desired action triggered by the user based on the aggregated customer information displayed on the user interface screen.

15. The computer readable media of claim 13, wherein the instructions that, when executed by a computing device comprising a client centric viewer, cause:
   displaying of an overview user interface screen associated with the customer, wherein the overview interface screen comprises a first section displaying customer account information, a second section displaying identified business opportunities, and a third section displaying identified business solutions.

16. The computer readable media of claim 15, wherein the instructions that, when executed by a computing device comprising a client centric viewer, cause:
   aggregating, based on the customer information, communication information corresponding to a plurality of customer communications with the first plurality of business application systems and the second plurality of business application systems;
   formatting, via a configuration file, the communication information for display in a fourth section of the user interface; and
   displaying the communications information in the fourth section of the user interface, wherein the customer communications include a date of the communications, page information corresponding to one or more pages accessed by the user, and a number of times each page was accessed.

17. The computer readable media of claim 15, wherein the instructions that, when executed by a computing device comprising a client centric viewer, cause:
   identifying, by an alert monitor of the computing device, one or more alerts based on analyzed customer information; and
   displaying, on a display device, in a fifth section of the user interface screen, alert information, wherein an alert includes a missing information alert comprising an identification of information missing from at least one business application computing system of the first plurality of business application systems and the second plurality of business application systems.

18. The computer readable media of claim 15, wherein the instructions that, when executed by a computing device comprising a client centric viewer, cause:
   receiving, by the computing device, one or more reports associated with a status of product and services associated with the customer; and
   displaying, on a display device, in a sixth section of the user interface screen, a link to one or more of the reports.

19. The computer readable media of claim 10, wherein the instructions that, when executed by a computing device comprising a client centric viewer, cause:
   receiving an input from an input device, wherein the input corresponds to a desired action triggered by the user based on the aggregated customer information displayed on a user interface screen; and
   determining whether the input corresponds to a configuration request; and
   generating a configuration file comprising a configuration of the user interface screen customized for a particular customer based on the configuration request.

20. An apparatus comprising:
a processor; and
non-transitory memory storing instructions that, when executed by the processor, cause the apparatus to:
   receive, from a user interface device, a client identifier corresponding to a customer of a business organization;
   query, via a network in response to receipt of the client identifier, each of a plurality of business application computing systems for information associated with the client identifier;
   obtain, from a first plurality of business application systems and a second plurality of business application systems based on the client identifier, customer information corresponding to client interaction with each of the first plurality of business applications systems and the second plurality of business application systems and an electronic record of one or more customer contacts with the business organization;
   aggregate the customer interaction information obtained from each of the plurality of business application computing systems;
   compare, aggregated customer interaction information to specified criteria to determine whether the customer is eligible for one or more business opportunities;
   when a business opportunity has been identified based on the comparison, populate a first portion of the user interface screen with information associated with the identified business opportunity;
   when an analysis of the aggregated customer interaction information includes an indication of missing information, generate an alert and populate a second portion of the user interface screen with alert information;
   receive, by a user interface, an input comprising an acceptance of the identified business opportunity via an input on a third portion of the user interface screen;
   retrieve, upon receipt of the input, a form associated with the identified business opportunity from a forms data repository; and
   complete, automatically using the aggregated customer interaction information, at least a portion of the form after receiving an indication that the customer accepted the identified business opportunity by auto-populating at least the portion of the form using the aggregated customer interaction information.

* * * * *

UNITED STATES PATENT AND TRADEMARK OFFICE
CERTIFICATE OF CORRECTION

| | |
|---|---|
| PATENT NO. | : 11,403,696 B2 |
| APPLICATION NO. | : 16/995075 |
| DATED | : August 2, 2022 |
| INVENTOR(S) | : Roberts et al. |

It is certified that error appears in the above-identified patent and that said Letters Patent is hereby corrected as shown below:

In the Claims

Column 18, Claim 10, Line 20:
Delete "applications" and insert --application-- therefor Column 20, Claim 20, Line 26:
Delete "applications" and insert --application-- therefor Signed and Sealed this
Ninth Day of January, 2024

Katherine Kelly Vidal
*Director of the United States Patent and Trademark Office*